United States Patent
Sanches

(10) Patent No.: US 11,793,193 B2
(45) Date of Patent: *Oct. 24, 2023

(54) CRYOPRESERVING UNGULATE EMBRYOS

(71) Applicant: ABS Global, Inc., DeForest, WI (US)

(72) Inventor: Bruno Valente Sanches, San Paulo (BR)

(73) Assignee: ABS Global, Inc., DeForest, WI (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/685,189

(22) Filed: Mar. 2, 2022

(65) Prior Publication Data

US 2022/0183276 A1   Jun. 16, 2022

Related U.S. Application Data

(63) Continuation of application No. 15/743,893, filed as application No. PCT/IB2016/001112 on Jul. 13, 2016, now Pat. No. 11,297,831.

(60) Provisional application No. 62/192,544, filed on Jul. 14, 2015.

(51) Int. Cl.
*A01N 1/02* (2006.01)
*A61D 19/04* (2006.01)

(52) U.S. Cl.
CPC ......... *A01N 1/0284* (2013.01); *A01N 1/0268* (2013.01); *A61D 19/04* (2013.01)

(58) Field of Classification Search
CPC .... A01N 1/0284; A01N 1/0268; A61D 19/04; C12N 5/0604; C12N 5/0609; C12N 2500/02
See application file for complete search history.

(56) References Cited

U.S. PATENT DOCUMENTS

| | | |
|---|---|---|
| 5,160,312 A | 11/1992 | Voelkel |
| 5,504,002 A | 4/1996 | Aoyagi |
| 5,707,339 A | 1/1998 | Kameyama |
| 2002/0028849 A1 | 3/2002 | Godkin et al. |
| 2010/0136512 A1 | 6/2010 | King et al. |

FOREIGN PATENT DOCUMENTS

| | | |
|---|---|---|
| AU | 2004237425 B2 | 11/2004 |
| CN | 103179852 B2 | 4/2015 |
| CN | 104488853 A | 4/2015 |
| CN | 104488853 B | 8/2016 |
| JP | 2014-143950 A | 8/2014 |
| WO | WO-01/92478 A1 | 12/2001 |

OTHER PUBLICATIONS

Costa-Borges et al. (2009). Collection and Cryopreservation of Hamster Oocytes and Mouse Embryos. Journal of Visualized Experiments (JoVE). 25. http://www.jove.com/index/Details.stp?ID=1120, doi: 10.3791/1120.
George et al., Theriogenology, 2008, vol. 69, p. 612-623.
Morato et al., Cryobiology, 2014, vol. 68, p. 288-293.
Nivet et al., FSH withdrawal improves developmental competence of oocytes in the bovine model, Reproduction, vol. 143, p. 165-171. (Year: 2012).
Pyne DG, Liu J, Abdelgawad M, Sun Y (2014) Digital Microfluidic Processing of Mammalian Embryos for Vitrification. PLOS ONE 9(9): e108128. doi:10.1371/journal.pone.0108128.
Sudano et al., Theriogenology, 2011, vol. 75, p. 1211-1220.
Yanhua dissertation cited in 102726-0169 Dec. 9, 2019.

*Primary Examiner* — Taeyoon Kim
*Assistant Examiner* — Tiffany M Gough
(74) *Attorney, Agent, or Firm* — Elizabeth A. Epstein; Daniel M. Lorentzen

(57) ABSTRACT

Technologies for cryopreserving ungulate embryos for implantation into recipient females are described.

22 Claims, 2 Drawing Sheets

2A. FREEZING PROTOCOL

2B. THAWING PROTOCOL

CRYOPRESERVING UNGULATE EMBRYOS

CROSS-REFERENCE TO RELATED APPLICATIONS

This application claims priority to U.S. application Ser. No. 15/843,893, filed Jan. 11, 2018, which is a U.S. National Phase Application under 35 U.S.C. § 371 of International Application No. PCT/IB2016/001112, filed Jul. 13, 2016, which claims priority to U.S. Provisional Application Ser. No. 62/192,544, filed Jul. 14, 2015, the disclosures of which are hereby incorporated by reference in their entireties.

BACKGROUND

In vitro embryo production is a major component of cattle breeding. Often, more embryos are produced than are implanted. Although over 30% of conception rates have recently been achieved in the embryo transfer (ET) of vitrified in vitro produced (IVP) embryos, the complex process of recovery of these embryos after vitrification remains an obstacle to commercial use of this technique. There is a need for novel, efficient protocols for bovine embryo cryopreservation.

SUMMARY

The present invention provides technologies for cryopreserving bovine embryos and/or for achieving fertilization with cryopreserved bovine embryos. The present invention also provides cryopreserved embryos, populations of such cryopreserved embryos, systems for generating and/or storing them, etc.

Among other things, the present invention encompasses the identification of a source of a problem with certain available technologies for embryonic transfer of cryopreserved embryos, particularly with processes for recovering (e.g., thawing, implanting, etc.) cryopreserved embryos. For example, the present disclosure appreciates that personnel and time required to recover viable cryopreserved embryos according to many standard technologies raise concerns with respect to their commercial applicability.

Furthermore, the present disclosure also appreciates that there is a need for transfer technologies for cryopreserved embryos that achieve improved conception rates relative to most standard technologies that utilize cryopreserved embryos, it being understood that such standard technologies typically achieve conception rates that are far below those achieved with fresh embryos. Among other things, the present disclosure provides technologies that achieve desirable (e.g., about 10% or more) conception rates for cryopreserved embryos.

In some embodiments, the invention provides methods comprising steps of, for example: obtaining in vitro produced (IVP) ungulate embryos; cryopreserving the embryos; and transferring embryos for implantation in recipient ungulates, the cryopreservation and transferring being performed so that pregnancy rates of at least about 10% are achieved.

In some embodiments, obtaining one or more in vitro produced embryos comprises steps of, for example: recovering one or more oocytes from females; maturing one or more oocytes in vitro; fertilizing one or more mature oocytes with semen or one or more isolated sperm cells so that one or more zygotes are generated; and denuding and culturing the one or more zygotes. In some embodiments, utilized semen are gender separated. In some embodiments, semen are not gender separated.

In some embodiments, maturing oocytes in vitro comprises, for example: incubating oocytes within a physiologically relevant range of for at least one condition selected from the group consisting of: temperature, presence or amount of gas, humidity, pH, osmolarity, and combinations thereof. In some embodiments, the presence or amount of a gas is selected from the group consisting of $O_2$ and $CO_2$. In some embodiments, the step of maturing oocytes in vitro comprises: incubating oocytes at 35-40° C. with 3-9% $CO_2$ and saturated humidity. In some embodiments, the step of denuding and culturing zygotes comprises incubating the zygotes at 35-40° C. with 5% $CO_2$ in air, and saturated humidity. In some embodiments, the step of denuding and culturing zygotes further comprises incubating the zygotes at 5% $O_2$.

In some embodiments, cryopreserving embryos comprises steps of, for example: incubating embryos in a solution comprising cryoprotectant; and immersing the embryos in liquid nitrogen. In some embodiments, the step of cryopreserving the embryo comprises steps of: incubating embryos in freezing solution consisting of 1.0-4 M of ethylene glycol for 5-30 minutes at a first temperature within a range of about 10° C. to about 38° C.; loading the embryos in a receptacle, wherein air bubbles separate embryos from a thawing solution that comprises ethylene glycol in an isotonic diluent medium; exposing the embryos to a temperature within a range of about −2 to about −10° C. for a time period within a range of about 1 min to about 60 minutes; lowering the temperature at a rate within a range of about −0.2 to about −0.8° C. per minute until reaching a second temperature within a range of about −30 to about −36° C.; and immersing the embryos in liquid nitrogen for storage. In some embodiments, the ethylene glycol is present at a final concentration within a range of about 0.2 to about 1.3 Molar.

In some embodiments, embryos are cryopreserved for direct transfer into recipient females.

In some embodiments, transferring embryos comprises steps of: culturing embryos in a medium supplemented with bovine serum albumin (BSA) under mineral oil for a period of time within a range of about 5 to about 9 days; and transferring the embryos into recipient ungulates. In some embodiments, the medium is selected from the group consisting of C4 medium, SOF medium, SOFaa medium and combinations thereof. In some embodiments the medium is supplemented with one or more of serum, fetal bovine serum, fetal calf serum, bovine serum albumin and/or one or more amino acids.

In some embodiments, transferred embryos are in a developmental stage selected from the group consisting of morula, early blastocyst, blastocyst and expanded blastocyst.

In some embodiments, recipient ungulates are synchronized. In some embodiments, recipient ungulates are in natural estrus. In some embodiments, embryos are fresh, vitrified, or frozen. In some embodiments, ungulates are cattle. In some embodiments, embryos of a species are selected from *Bos Taurus*, *Bos indicus*, and crossed breed *Bos indicus-taurus*.

In some embodiments, the invention provides a cryopreserved embryo produced by a method comprising steps of, for example: obtaining in vitro produced (IVP) ungulate embryos; cryopreserving the embryos under conditions so that, when the cryopreserved embryos are transferred to recipient ungulates, pregnancy rates of at least about 10% are achieved. In some embodiments, obtaining in vitro produced embryos comprises steps of, for example: recovering oocytes from females; maturing oocytes in vitro; fertilizing mature oocytes with semen; and denuding and culturing zygotes. In some embodiments, maturing oocytes in vitro comprises incubating oocytes within a physiologically relevant range of for at least one condition selected from the group consisting of: temperature, presence or amount of gas, humidity, pH, osmolarity, and combinations thereof. In some embodiments, transferring embryos comprises steps of: culturing embryos in a medium supplemented with bovine serum albumin (BSA) under mineral oil for a period of time within a range of about 5 to about 9 days; and transferring the embryos into recipient ungulates.

In some embodiments, media utilized in accordance with the present invention is or comprises a medium selected from the group consisting of C4 medium, SOF medium, SOFaa medium and combinations thereof. In some embodiments the medium is supplemented with one or more of serum, fetal bovine serum, fetal calf serum, bovine serum albumin and/or one or more amino acids.

In some embodiments, embryos cryopreserved and/or transferred in accordance with the present disclosure are in a developmental stage selected from the group consisting of morula, early blastocyst, blastocyst, and expanded blastocyst.

In some embodiments, the invention provides a device comprising: a receptacle; a cryopreserved embryo in cryopreservation solution positioned within a first region of the receptacle, which first region is flanked by: second and third regions, each of which contains air, which second and third regions are flanked by: fourth and fifth regions, each of which contain thawing solutions, which fourth and fifth regions are flanked by: sixth and seventh regions, each of which contain air, which sixth and seventh regions are flanked by: eighth and ninth regions, each of which contain thawing solutions. In some embodiments, one or more of the regions is a chamber in that the chamber is defined by a physical partition entity that provides a barrier between it and at least one other region with which it is adjacent. In some embodiments, the invention provides a plurality of the devices.

In some embodiments, the invention provides methods comprising steps of: cryopreserving a plurality of ungulate embryos; and transferring the plurality embryos into recipient ungulates, wherein the cryopreserving and transferring are performed so that a conception rate of at least 30% is achieved. In some embodiments, the step of cryopreserving positioning each embryo in cryopreservation solution within a first region of a receptacle, which first region is flanked by: second and third regions, each of which contains air, which second and third regions are flanked by: fourth and fifth regions, each of which contain thawing solutions, which fourth and fifth regions are flanked by: sixth and seventh regions, each of which contain air, which sixth and seventh regions are flanked by: eighth and ninth regions, each of which contain thawing solution.

In some embodiments, the invention provides methods of freezing embryos, for example comprising: exposing ungulate embryos to freezing solution (SC), consisting of about 1 to about 4M of ethylene glycol for 10 minutes at 35° C.; positioning each embryo, in a freezing solution (SC), within a receptacle dimensioned as a straw, so that the embryo in freezing solution is, surrounded by four columns of thawing solution (SD), interleaved by columns of air between them, wherein the thawing solution comprises about 0.75 M of ethylene glycol; exposing the receptacle to temperature conditions stabilized at a temperature within a range of about 0° C. to about −10° C.; crystallizing the columns above and below the embryo two minutes after being placed in the freezing machine; maintaining the embryo for 1 to 60 minutes at a temperature within a range of about 0° C. to about −10° C.; lowering the temperature at a rate within a range of about −0.2° C. to about −0.8° C. per minute until reaching a second temperature within a range of about −30° C. to about −36° C.; and immersing the frozen embryos in liquid nitrogen. In some embodiments, the receptacle, containing the frozen embryo, is immersed in liquid nitrogen after reaching the second temperature within a range of about −30° C. to about −36° C.

In some embodiments, the invention provides methods of thawing embryos, for example comprising: exposing a receptacle that contains a cryopreserved embryo in cryopreservation solution positioned within a first region of the receptacle, which first region is flanked by: second and third regions, each of which contains air, which second and third regions are flanked by: fourth and fifth regions, each of which contain thawing solutions, which fourth and fifth regions are flanked by: sixth and seventh regions, each of which contain air, which sixth and seventh regions are flanked by: eighth and ninth regions, each of which contain thawing solutions to room temperature air for a first period of time, which first period of time is sufficient to begin thawing the frozen embryos; exposing the receptacle to a thawing environment characterized by a thawing temperature within a range of about 10° C. to about 38° C. for a second period of time, which second period of time is sufficient to thaw the freezing solution; and mixing the thawing solution, freezing solution and embryo within the receptacle. In some embodiments, the first period of time is within a range of about 10° C. to about 38° C. In some embodiments, the second period of time is within a range of about 20° C. to about 38° C. In some embodiments, the thawing environment is or comprises a liquid bath. In some embodiments, the thawing temperature is within a range of about 10° C. to about 38° C. In some embodiments, the step of mixing is achieved through gentle agitation of the receptacle. In some embodiments, the method of thawing further includes a step of transferring the embryo into a recipient ungulate. In some embodiments, the transferring is performed simultaneously with or after the step of exposing or the step of mixing. In some embodiments, the step of transferring comprises transferring the embryo to the recipient ungulate's uterine horn.

DEFINITIONS

Figure 1:
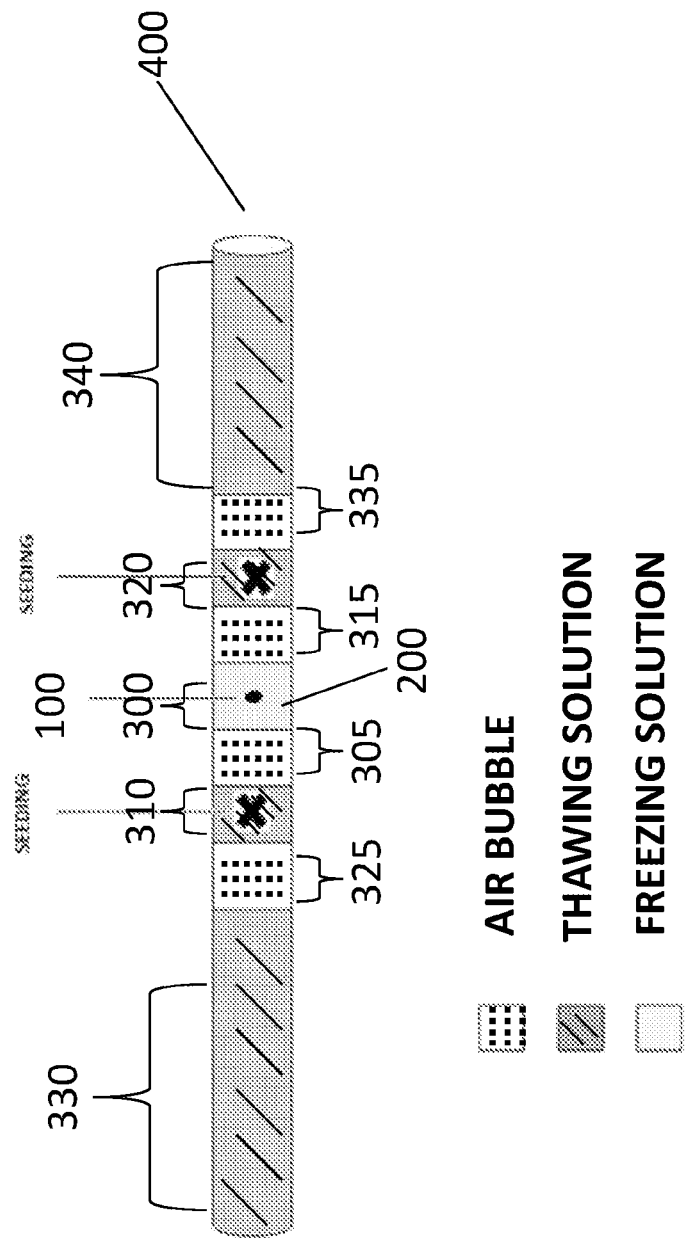
FIG. 1 depicts a loading scheme for using frozen embryos in direct transfer of embryos. As depicted in this Figure, embryos in freezing solution may be arranged in devices (e.g., one embryo per device) in which regions of solution are separated by regions of air. For example, as depicted in FIG. 1, an embryo 100 in freezing solution 200 is localized within a first region 300 (greyed in FIG. 1) of a columnar device 400 (e.g., a straw). Immediately flanking that first region are two regions (second 305 and third 315 regions, each of which is stippled in FIG. 1) that contain air, and then two regions (fourth 310 and fifth 320 regions, each of which is striped in FIG. 1) that contain thawing solution, followed by two more regions (sixth 325 and seventh 335 regions, each of which is stippled in FIG. 1) that also contain air, followed by two more regions (eighth 330 and ninth 340 regions, each of which is striped in FIG. 1) that also contain thawing solution. The particular device depicted in FIG. 1 is a 0.25 mL straws are placed on a central column; the freezing solution is 1.5 M ethylene glycol; and the thawing solution is a 1:1 dilution of the freezing solution in DPBS, so that it is 0.75 M ethylene glycol in DPBS.

In order for the present invention to be more readily understood, certain terms are defined below. Those skilled in the art will appreciate that definitions for certain terms may be provided elsewhere in the specification, and/or will be clear from context.

Approximately: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Artificial Insemination (AI): As used herein, the term "artificial insemination (AI)" refers to introduction by the hand of man of semen into a female bovine's uterus to achieve pregnancy. In many embodiments, AI is utilized in breeding, for example so that resulting pregnancies are (or are intended to be) carried to term. In some embodiments, AI is carried out with collected semen. In some embodiments, AI is carried out with extracted semen. In some embodiments, AI is carried out with semen that has been processed; for example, in some embodiments, the semen has been sexed so that it is enriched for sperm of only one gender. Those skilled in the art will appreciate that. Unless otherwise expressly indicated, the term "AI" does not encompass embryos transfer procedures, where, for example, semen may be introduced into a cow to generate embryos for transfer.

Blastocyst: As used herein, the term "blastocyst" refers to a structure formed in the early development of mammals. It possesses an inner cell mass (ICM) which subsequently forms the embryo. The trophoblast is the outer layer of cells of the blastocyst. This layer surrounds an inner cell mass (which is a source of embryonic stem cells) and a fluid-filled cavity known as the blastocoele. The trophoblast gives rise to the placenta. The use of blastocysts for in-vitro fertilization (IVF) involves culturing a fertilized egg before implanting it into a bovine uterus.

Breed: As used herein, the term "breed" refers to a group of ungulates (e.g., cattle) having common ancestors and/or sharing certain distinguishable traits that are not shared ungulates of other breeds. Those skilled in the art are familiar with breed standards and/or characteristics. In many embodiments, a particular breed is produced and/or maintained by mating particular identified parent or parents (e.g., a particular sire with a particular dam or with any one dame from of a particular dam line) with one another.

Comparable: The term "comparable" is used herein to describe two (or more) sets of conditions, circumstances, individuals, or populations that are sufficiently similar to one another to permit comparison of results obtained or phenomena observed. In some embodiments, comparable sets of conditions, circumstances, individuals, or populations are characterized by a plurality of substantially identical features and one or a small number of varied features. Those of ordinary skill in the art will appreciate that sets of circumstances, individuals, or populations are comparable to one another when characterized by a sufficient number and type of substantially identical features to warrant a reasonable conclusion that differences in results obtained or phenomena observed under or with different sets of circumstances, individuals, or populations are caused by or indicative of the variation in those features that are varied. Those skilled in the art will appreciate that relative language used herein (e.g., enhanced, activated, reduced, inhibited, etc.) will typically refer to comparisons made under comparable conditions.

Crossbreed: As used herein, the term "crossbreed" refers to ungulates (e.g., cattle) produced from gametes of individual animals that are different breeds or varieties of ungulates (e.g., cattle). Crossbreeding is often performed in dairy cattle farming to produce healthier, more productive cattle compared to the parent breeds. Crossbreeding is the deliberate mating of animals from different breeds or strains; in many embodiments crossbreeding is designed to take advantage of heterosis (hybrid vigor) for characteristics like production, fertility and longevity. In some embodiments, the present disclosure encompasses the insight that recent developments relating to artificial insemination and/or in vitro fertilization, not typically employed in the dairy cattle industry, can be utilized to enable and/or provide certain advantages with respect to generating and/or maintaining crossbreed lines of dairy cattle as described herein. As described herein, crossbreed ungulates of particular interest are hybrids, in which 50% of the animal's somatic chromosomes are from one strain or line and 50% are from a different strain or line (i.e., formed by crossing F0 individuals from first and second strains/lines that differ from one another. Those of ordinary skill in the art will appreciate, however, that the term "crossbreed" can be used in some embodiments (as is clear from context) to refer to any individual whose genome, as a result of crossing, is not 100% from any single breed.

Diploid Cell: As used herein, the term "diploid cell" refers to a cell with a homologous pair of each of its autosomal chromosomes, with two copies (2n) of each autosomal genetic locus.

Developmental Stage: As used herein, the term "developmental stage" refers to stages of embryonic development. In some embodiments, developmental stages include: the morula, early blastocyst, blastocyst, and expanded blastocyst.

Direct Transfer: As used herein, the term "direct transfer" refers to a method of slowly cryopreserving an embryo. Embryos are incubated in freezing solution comprising cryoprotectants, such as ethylene glycol or glycerol, and exposed to gradually decreasing temperatures until the embryo is frozen and subsequently immersed in liquid nitrogen. In some embodiments, the embryo within freezing solution is loaded onto a straw that is exposed to freezing temperatures. The direct transfer method of cryopreservation is also referred to as slow freezing.

Embryo: As used herein, the term "embryo" refers to a fertilized oocyte (egg) prepared for immediate implantation within a female ungulate or stored for eventual implantation within a female ungulate.

Fresh Transfer: As used herein, the term "fresh transfer" is used to refer to a method of implanting embryos in recipient ungulates (e.g., cattle) after fertilization—avoiding cryopreservation. In some embodiments, embryos are cultured in vitro for days before being implanted into a recipient female.

Gametes: As used herein, the term "gametes" is used to refer to reproductive cells (e.g., spermatozoa or oocytes) having the haploid number of chromosomes, especially a mature sperm or egg capable of fusing with a gamete of the opposite sex to produce a fertilized egg. Gametes are produced through the process of meiosis.

Gender separated semen: As used herein, the term "gender separated semen" refers to semen which has been manipulated to select for spermatocytes of only one preferred gender. In some embodiments, gender separated semen is also known as sexed semen. In some embodiments, gender separated semen is "gender enriched semen," which refers to semen which has been manipulated to enrich for spermatocytes of only one preferred gender. In some embodiments, gender enriched semen comprises at least about 55%, about 60%, about 65%, about 70%, about 75%, about 80%, about 85%, about 90%, about 91%, about 92%, about 93%, about 94%, about 95%, about 96%, about 97%, about 98%, or about 99% spermatocytes of only one preferred gender.

Genome Profile: As used herein, the term "genome profile" refers to a representative subset of the total information contained within a genome. Typically, a genome profile contains genotypes at a particular set of polymorphic loci. In some embodiments, a genome profile may correlate with a particular feature, trait, or set thereof characteristic of, for example, a particular animal, line, breed, or crossbreed population.

Genotype: As used herein, the term "genotype" refers to the diploid combination of alleles at a given genetic locus, or set of related loci, in a given cell or organism. A homozygous subject carries two copies of the same allele and a heterozygous subject carries two distinct alleles. In the simplest case of a locus with two alleles "A" and "a," three genotypes can be formed: A/A, A/a, and a/a.

Genotyping: As used herein, the term "genotyping" refers to an experimental, computational, or observational protocol for distinguishing an individual's genotype at one or more well-defined loci. Those skilled in the art will be aware of a variety of technologies that can usefully and effectively perform genotyping. In some embodiments, genotyping involves direct detection of a nucleic acid or nucleic acid sequence. In some embodiments, genotyping involves indirect detection of a nucleic acid or nucleic acid sequence, for example through detection or analysis of a proxy marker or event that correlates with presence of the nucleic acid or nucleic acid sequence.

Haploid Cell: As used herein, the term "haploid cell" refers to a cell with a single set (1n) chromosome of chromosomes—half the number of a somatic cell.

Heifer: As used herein, the term "heifer" refers to female cattle who have not yet produced any calves.

Hybrid: As used herein, the term "hybrid" refers to ungulates (e.g., cattle) produced as a result of crossing male and female gametes from different breeds or lines of ungulates. Thus, typically, 50% of the autosomal genome (e.g., the somatic genome) of a hybrid is from a first breed/line, and 50% is from a second breed/line. Of particular interest, as described herein, are hybrids in which 50% of its somatic chromosomes are from a first breed and 50% are from a second breed.

In Vitro Fertilization (IVF): As used herein, the term "in vitro fertilization" refers to a method of fertilizing an egg outside of a living animal. IVF is a process by which an egg is fertilized by sperm outside the body (i.e., in vitro, which literally translates to "in glass" but is understood in the art to refer to processes performed, for example, in a laboratory or other artificial setting). In some embodiments, an IVF process may involve monitoring and/or stimulating a female's ovulatory process, removing oocyte or oocytes (egg or eggs) from a female's ovaries, and/or contacting sperm and oocytes with one another in a laboratory (e.g., in a fluid medium) to achieve fertilization. In some embodiments, IVF involves culturing a fertilized egg (zygote) in a growth medium and/or either implanting it in a female's uterus or storing it for future analysis and/or implantation. In some embodiments, IVF may involve sorting fertilized eggs for particular desired attributes (e.g., gender).

Line: As used herein, the term "line" refers to a strain of cattle descended from common ancestral parents developed and maintained by selective breeding.

Mating: The term "mating," as used herein, refers to a process that results in formation of an embryo, typically from two opposite-gender gametes. In some embodiments, mating involves natural service. In some embodiments, mating involves artificial insemination. In some embodiments, mating involves IVF. In many embodiments described herein, mating is utilized to generate hybrid progeny. In many embodiments, mating is utilized to generate crossbreed progeny.

Morula: As used herein, the term "morula" refers to a stage of embryonic development. The morula, an early stage embryo which consists of a ball of cells (called blastomeres) contained within the zona pellucida, is produced from the single-celled zygote by a series of cleavages. Through cellular differentiation and cavitation, the morula gives rise to the blastocyst. Once a fluid-filled cavity begins to open up in the morula, the blastocyst stage of embryonic development starts. During blastocyst formation, the morula's cells differentiate into an inner cell mass growing on the interior of the blastocoel and trophoblast cells growing on the exterior.

Natural Service: As used herein, the term "natural service" refers to traditional cattle breeding of pairing males and females without artificial insemination or IVF-based techniques.

Receptacle: As used herein, the term "receptacle" refers to a device for containing one or more cryopreserved embryos. The receptacle may contain a series of regions, or chambers, for holding: air, thawing solution, or embryo in cryopreservation solution. In some embodiments, the receptacle is or comprises a straw.

Substantially: As used herein, the term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

Trait: As used herein, the term "trait" refers to a detectable attribute of an individual. Typically, expression of a particular trait may be fully or partially influenced by an individual's genetic constitution. In some embodiments, a trait is characteristic of a particular individual, line, breed or crossbreed, for example in that it can be relied upon (individually or as part of a set) to distinguish that individual, line, breed, or crossbreed from others.

Ungulate: As used herein, the term "ungulate" refers to a diverse group of large mammals that includes equines, bovines/cattle, pigs, goats, buffalo, sheep, giraffes, camels, deer, and hippopotamuses. Most terrestrial ungulates use the tips of their toes, usually hoofed, to sustain their whole body weight while moving. In some embodiments, the term means, roughly, "being hoofed" or "hoofed animal".

Vitrification: As used herein, the term "vitrification" refers to a method to cryopreserve egg cells (oocytes) and embryos. In some embodiments, embryos are exposed to equilibration and vitrification solutions comprising cryoprotectants, such as ethylene glycol or glycerol, and immersed in liquid nitrogen as part of the cryopreservation process.

Zygote: As used herein, the term "zygote" refers to a cell formed when two gamete cells are joined by means of sexual reproduction. It is the earliest developmental stage of the embryo. A zygote is synthesized from the union of two gametes, and represents the first stage in a unique organism's development. Zygotes are produced by fertilization between two haploid cells—an ovum (female gamete) and a sperm cell (male gamete)—which combine to form the single diploid cell.

DETAILED DESCRIPTION OF CERTAIN EMBODIMENTS

The present invention is based, in part upon the discovery that it is possible to cryopreserve ungulate embryos with improved conception rates relative to most standard technologies, whose rates are typically far below rates of conception achieved with fresh embryos.

In some embodiments, the invention provides methods comprising steps of: obtaining in vitro produced embryos; cryopreserving the embryos; and transferring embryos for implantation in recipient ungulates, the cryopreservation and transferring being performed so that pregnancy rates of at least about 10% are achieved. In some embodiments, the invention provides embryos cryopreserved by the disclosed methods. In some embodiments, the invention provides receptacles for freezing, storing and thawing cryopreserved embryos.

In Vitro Produced Embryos

The use of in vitro produced embryos (IVP) has greatly increased over the last decade (Hasler, 2014). Much of this growth occurred mainly in Brazil. In 2013, more than 393,000 IVP embryos were transferred to recipients, and of this total, 78% were produced in South America. In the same year, from the total number of transfers, only 8.9% of IVP embryos were frozen; for embryos in vivo, this proportion was 59% (Perry, 2013).

The IVP embryos are less resistant to cryopreservation than embryos in vivo and fetal bovine serum (FBS) added to the culture medium of embryos can provide the greater accumulation of intracytoplasmic lipid embryos (Mucci et al., 2006) which is one of the factors responsible for the increased sensitivity of IVP embryos to freezing.

Currently, the cryopreservation technique most commonly used for IVP embryos is vitrification (Dode et al., 2013), for its simplicity, speed and low cost. However, this technique uses high concentrations of cryoprotectants and requires trained personnel and laboratory structure for the recovery of embryos before transfer (Vajta et al., 1998), restricting its use in the field and on a large scale.

On the other hand, slow freezing of embryos for subsequent direct transfer, despite having slightly larger operating costs, permits the use of lower concentrations of cryoprotectants and hence less toxicity of embryos (Voelkel and Hu, 1992).

In some embodiments, the present invention provides for improved methods of implanting bovine embryos cultured in serum. Cattle that receive fertilized embryos previously incubated in Fetal Bovine Serum (FBS) had similar rates of conception as cattle that received embryos without prior exposure to FBS. In some embodiments, the present invention is a method of cryopreserving bovine embryos in such a way that the recipient cattle have conception rates similar to freshly transferred embryos. Cattle that received embryos freshly fertilized had similar conception rates as vitrified embryos and direct transfer/slow frozen embryos. This demonstrates that the direct transfer/slow frozen method of embryo cryopreservation is as viable as the vitrification method. For convenience, direct transfer/slow frozen is an appropriate substitute for the vitrification method.

In some embodiments, prior to fertilization and cryopreservation, oocytes may undergo in vitro maturation. In some embodiments, the oocyte is incubated in the presence of oxygen ($O_2$). In some embodiments, the oocyte is incubated in the presence of carbon dioxide ($CO_2$). In some embodiments, the oocyte is incubated in the presence of 3-9% $CO_2$. In some embodiments, the oocyte is incubated in the presence of 5% $CO_2$. In some embodiments, the oocyte is incubated in the presence of 5% $O_2$.

Conventional Cattle Husbandry

Animal husbandry is the management and care of farm animals by humans for profit, in which genetic qualities and behavior, considered to be advantageous to humans, are further developed. The term can refer to the practice of selectively breeding and raising livestock to promote desirable traits in animals for utility, sport, pleasure, or research.

Animal husbandry combines the art and science of raising animals by blending time-honored practices and modern scientific knowledge into a system that provides for animal well-being and provides for safe and efficient management and handling of animals. Animal husbandry practices change as scientists, agricultural experts, and others involved with animals learn new techniques or phase out those that are no longer necessary or appropriate. Animal husbandry practices range from dehorning cattle to prevent injury to herd-mates and farm hands to methods for housing livestock, providing adequate nutrition, and devising breeding strategies.

Techniques such as artificial insemination and embryo transfer have been developed and can be used to facilitate breeding. For example, because such technologies permit a dam to carry an embryo other than her own, they can be used to ensure that large numbers of embryos from a particular high quality dam (or dam line) can be implanted into a lower-quality surrogate, thereby expanding the number of progeny that can be generated from the high-quality dam. This practice can vastly increase the number of offspring which may be produced by a small selection of the best quality parent animals. However, as discussed herein, such technologies have not typically been employed with dairy cattle. Among other things, they are often deemed to be too expensive to warrant use with dairy cattle. Also, to the extent that they tend to amplify particular genetic traits within a herd, they decrease genetic diversity within the herd, increasing the severity of certain disease outbreaks among other risks. Among other things, the present invention encompasses the insight that such techniques, particularly when combined with crossbreeding strategies, can provide significant advantages in the husbandry of cattle as compared with conventional approaches.

Embryonic and Fertilization Technologies

Various techniques have been developed and refined to permit humans to control and/or effect animal matings optionally without animal intercourse (e.g., natural service) or even animal contact. Representative such techniques include, for example, in vitro fertilization, artificial insemination, cryopreservation (freezing) of gametes or embryos, induction of multiple ovulations, embryo transfer, sex determination of sperm or embryos, nuclear transfer, cloning, etc.

In vitro production of ruminant embryos is a three-step process involving oocyte maturation, oocyte fertilization and in vitro culture. Only 30-40% of such oocytes reach the blastocyst stage, at which they can be transferred to a recipient or frozen for future use. The quality of the oocyte can dramatically impact the proportion of immature oocytes that form blastocysts while the post-fertilization culture environment has a major influence on the quality of the blastocyst. In some embodiments, use of sperm of a specific gender in conjunction with in vitro embryo production is a potentially efficient means of obtaining offspring of the desired sex. Concerns regarding the use of sexed semen technology include the apparent lower fertility of sorted sperm, the lower survival of sorted sperm after cryopreservation and the reduced number of sperm that could be separated in a specified time period. Assessment of embryo quality is a challenge. Morphological assessment is at present the most popular method for embryo selection prior to transfer. Other non-invasive assessment methods include the timing of the first cleavage division which has been linked to developmental ability. Quantitative examination of gene expression is an additional valuable tool to assess the viability of cultured embryos. A substantial amount of evidence exists to demonstrate that the culture conditions to which the embryo is exposed, particularly in the post-fertilization period, can have perturbing effects on the pattern of gene expression in the embryo with potentially important long-term consequences.

IVF is a technique in which the oocytes are extracted from a donor cow by a method of aspiration from the reproductive tract. Selected ooytes are then incubated for a period of 24 hours; this is call the maturation period. After maturation, the eggs are fertilized 18 to 22 hours after the co-culture has been made. The embryos stay in the medium until the 7th day, when they are ready to be transferred. This technique has three main advantages over conventional in vivo embryo collection. With IVF, it is not necessary to superovulate the cows, nor is it necessary to synchronize them. This is a major breakthrough since the donor cows are not exposed to hormones that might compromise the reproductive soundness of the animals, and they can be worked without prior preparation time for the procedure. Embryo production averages about 30% of the oocytes harvested, although this quantity varies depending on the breed, the donor cow, and also the mating. Another advantage with the IVF is that the animals can be aspirated every 20 days instead of every 60 as in in vivo embryo collection. The other advantage of IVF is that the animals can be harvested at a very young age; this will create a major impact on breeding selection since it reduces the generation interval for the animals with a specific desirable trait.

Artificial insemination (AI) has been used to obtain offspring from genetically superior males for more than 200 years. Well known methods to cryopreserve (freeze) and store semen have made AT accessible to more livestock producers. In the same manner as cryopreservation of semen, embryo freezing allowed for the global commercialization of animals with high genetic qualities. Semen from bulls is especially amenable to freezing and long-term storage. In the dairy industry, where large numbers of dairy cows are managed intensely, AI is simple, economical, and successful. More than 60 percent of dairy cows in the United States are bred by AI. However, the situation is different for beef cattle, where breeding populations are usually maintained on range or pasture conditions. In the United States beef industry, AI accounts for less than 5 percent of inseminations.

Development of ET technology allows producers to obtain multiple progeny from genetically superior females. Fertilized embryos can be recovered from females (also called embryo donors) of superior genetic merit by surgical or nonsurgical techniques. The genetically superior embryos are then transferred to females (also called embryo recipients) of lesser genetic merit. In cattle, efficient techniques can recover fertilized embryos without surgery, but only one or sometimes two embryos are produced during each normal reproductive cycle. To increase the number of embryos that can be recovered from genetically superior females, the embryo donor is treated with a hormone regimen to induce multiple ovulations, or superovulation.

The beef industry in the United States prefers male calves, which tend to have higher body weights and higher feed efficiency (compared to female or heifer calves) when placed in feedlots for the growing and finishing stages of meat production. In contrast, the dairy industry prefers heifer calves, which will ultimately produce offspring and milk for human consumption. Thus, methods are needed to determine the sex of sperm or embryos so producers can control the sex of the offspring of their livestock.

Since the mid-1980s, technology has been developed to transfer the nucleus from either a blastomere (cells from early, and presumably undifferentiated cleavage stage embryos) or a somatic cell (fibroblast, skin, heart, nerve, or other body cell) to an enucleated oocyte (unfertilized female egg cell with the nucleus removed). This "nuclear transfer" produces multiple copies of animals that are themselves nearly identical copies of other animals (transgenic animals, genetically superior animals, or animals that produce high quantities of milk or have some other desirable trait, etc.). This process is also referred to as cloning. To date, somatic cell nuclear transfer has been used to clone cattle, sheep, pigs, goats, horses, mules, cats, rabbits, rats, and mice.

The technique involves culturing somatic cells from an appropriate tissue (fibroblasts) from the animal to be cloned. Nuclei from the cultured somatic cells are then microinjected into an enucleated oocyte obtained from another individual of the same or a closely related species. Through a process that is not yet understood, the nucleus from the somatic cell is reprogrammed to a pattern of gene expression suitable for directing normal development of the embryo. After further culture and development in vitro, the embryos are transferred to a recipient female and ultimately result in the birth of live offspring. The success rate for propagating animals by nuclear transfer is often less than 10 percent and depends on many factors, including the species, source of the recipient ova, cell type of the donor nuclei, treatment of donor cells prior to nuclear transfer, the techniques used for nuclear transfer, etc.

The present disclosure demonstrates the effectiveness of improved cryopreserving technologies for freezing and thawing ungulate embryos. The present disclosure demonstrates that such technologies can offer significant benefits to the dairy cattle industry.

In some embodiments, preserved embryos can be supplied to other farms and businesses, for example to permit them to generate hybrid progeny and/or herds. In some embodiments, the present invention allows for a business method of screening hybrid cattle and recreating high-performing hybrid cattle by selective breeding using the F0 gametes of their parents.

Cryoprotectants

As notes herein, the present invention provides technologies for cryopreserving bovine embryos and/or for achieving fertilization with cryopreserved bovine embryos. In some embodiments, cryoprotectants for use in accordance with the present invention are or comprise intracellular cryoprotectants. In some embodiments, cryoprotectants for use in accordance with the present invention are or comprise extracellular cryoprotectants. In some embodiments, exemplary cryoprotectants (e.g., for use as intracellular cryoprotectants) may be or comprise: dimethyl sulfoxide (DMSO), glycerol, polyethylene glycol (PEG), and combinations thereof. In some embodiments, exemplary cryoprotectants (e.g., for use as extracellular cryoprotectants) may be or comprise: sucrose, trehalose, dextrose, and combinations thereof. In some particular embodiments, cryoprotectants for use in accordance with the present invention may be or comprise propylene glycol.

Embryonic Developmental Stages

In some embodiments, embryos may be cryopreserved at various stages of development. In some embodiments, embryos may be cryopreserved at a stage of development selected from the group consisting of: morula, early blastocyst, blastocyst, and expanded blastocyst. After blastocyst formation, the embryo is prepared for implantation on the uterine wall. In some embodiments, the early blastocyst stage is characterized wherein a cavity is just beginning to form and blastocyst cells are not yet distinguishable. In some embodiments, the expanded blastocyst stage is characterized by a fully formed cavity.

Devices for Cryopreservation

The present invention provides devices for cryopreserving embryos. In some embodiments, devices comprise a cryopreserved embryo in cryopreservation solution positioned within a first region within the device, which first region is flanked by: second and third regions, each of which are comprised of air, which second and third regions are flanked by: fourth and fifth regions, each of which are comprised of thawing solutions, which fourth and fifth regions are flanked by: sixth and seventh regions, each of which are comprised of air, which sixth and seventh regions are flanked by: eighth and ninth regions, each of which are comprised of thawing solutions. In some embodiments, one or more regions of the device is a chamber.

In some embodiments, the present invention provides a plurality of the devices of for cryopreserving embryos. In some embodiments, each plurality of devices contains an embryo from a single mating.

In some embodiments, the present invention provides methods comprising steps of making a plurality of embryos; cryopreserving the plurality of embryos; and transferring the embryos with a conception rate of about 40%. In some embodiments, embryos are optionally stored for a period of time between cryopreserving and transferring to recipient cattle. In some embodiments, the period of time between cryopreserving and transferring to recipient cattle can be minutes, hours, days, weeks, months, years, or longer (e.g., multiples thereof). In some embodiments, embryos are stored for a period of time less than about 40 years, about 35 years, about 30 years, about 25 years, about 20 years, about 15 years, about 10 years, about 9 years, about 8 years, about 7 years, about 6 years, about 5 years, about 4 years, about 3 years, about 2 years, or about one year. In some embodiments, embryos are stored for a period of time less than about 12, about 11, about 10, about 9, about 8, about 7, about 6, about 5, about 4, about 3, about 2, about 1 months or less. In some embodiments, embryos are stored for a period of time of time less than about 6 weeks, about 5 weeks, about 4 weeks, about 3 weeks, about 2 weeks, about 1 week, or less. In some embodiments, embryos are stored for a period of time of time less than about 7 days, about 6 days, about 5 days, about 4 days, about 3 days, about 2 days, or about 1 day. In some embodiments, embryos are stored for a period of time of time less than about 24 hours, about 20 hours, about 16 hours, about 12 hours, about 8 hours, about 4 hours, about 3 hours, about 2 hours, or about 1 hour. In some embodiments, embryos are stored for a period of time of time less than about 60 minutes, about 50 minutes, about 40 minutes, about 30 minutes, about 20 minutes, about 10 minutes, about 5 minutes, about 4 minutes, about 3 minutes, about 2 minutes, or about 1 minute.

In some embodiments, the embryos can be stored for minutes, days or years before transferring to recipient cattle. In some embodiments, the period of time the embryos can be stored for can be minutes, hours, days, weeks, months, years, or longer (e.g., multiples thereof). In some embodiments, embryos are stored for a period of time less than about 40 years, about 35 years, about 30 years, about 25 years, about 20 years, about 15 years, about 10 years, about 9 years, about 8 years, about 7 years, about 6 years, about 5 years, about 4 years, about 3 years, about 2 years, or about one year. In some embodiments, embryos are stored for a period of time less than about 12, about 11, about 10, about 9, about 8, about 7, about 6, about 5, about 4, about 3, about 2, about 1 months or less. In some embodiments, embryos are stored for a period of time of time less than about 6 weeks, about 5 weeks, about 4 weeks, about 3 weeks, about 2 weeks, about 1 week, or less. In some embodiments, embryos are stored for a period of time of time less than about 7 days, about 6 days, about 5 days, about 4 days, about 3 days, about 2 days, or about 1 day. In some embodiments, embryos are stored for a period of time of time less than about 24 hours, about 20 hours, about 16 hours, about 12 hours, about 8 hours, about 4 hours, about 3 hours, about 2 hours, or about 1 hour. In some embodiments, embryos are stored for a period of time of time less than about 60 minutes, about 50 minutes, about 40 minutes, about 30 minutes, about 20 minutes, about 10 minutes, about 5 minutes, about 4 minutes, about 3 minutes, about 2 minutes, or about 1 minute.

In some embodiments, the step of cryopreserving comprises doing it in a device. Embryos can be cryopreserved within devices according to methods disclosed herein. In some embodiments, the step of cryopreserving comprises cryopreserving a plurality of the embryos, each in its own device, so that a set of devices is generated. In some embodiments, a plurality of devices are maintained for a first period of time. In some embodiments, after the first period of time, at least one embryo is transferred to recipient cattle; and optionally the remaining embryos are maintained for a second period of time. In some embodiments, the period of time can be up to 40 years. In some embodiments, the embryos can be stored for minutes, days or years days before being transferred to recipient cattle. In some embodiments, the second period of time the embryos can be stored for can be minutes, hours, days, weeks, months, years, or longer (e.g., multiples thereof). In some embodiments, embryos are stored for a period of time less than about 40 years, about 35 years, about 30 years, about 25 years, about 20 years, about 15 years, about 10 years, about 9 years, about 8 years, about 7 years, about 6 years, about 5 years, about 4 years, about 3 years, about 2 years, or about one year. In some embodiments, embryos are stored for a period of time less than about 12, about 11, about 10, about 9, about 8, about 7, about 6, about 5, about 4, about 3, about 2, about 1 months or less. In some embodiments, embryos are stored for a period of time of time less than about 6 weeks, about 5 weeks, about 4 weeks, about 3 weeks, about 2 weeks, about 1 week, or less. In some embodiments, embryos are stored for a period of time of time less than about 7 days, about 6 days, about 5 days, about 4 days, about 3 days, about 2 days, or about 1 day. In some embodiments, embryos are stored for a period of time of time less than about 24 hours, about 20 hours, about 16 hours, about 12 hours, about 8 hours, about 4 hours, about 3 hours, about 2 hours, or about 1 hour. In some embodiments, embryos are stored for a period of time of time less than about 60 minutes, about 50 minutes, about 40 minutes, about 30 minutes, about 20 minutes, about 10 minutes, about 5 minutes, about 4 minutes, about 3 minutes, about 2 minutes, or about 1 minute.

In some embodiments the device comprises a receptacle for containing one or more cryopreserved embryos. In some embodiments the receptacle comprises regions or chambers for containing embryos in solution flanked by air bubbles. In some embodiments the receptacle comprises regions or chambers for separating embryos from other embryos. In some embodiments, the receptacle comprises a straw.

Exemplification

The aim of this study was to compare pregnancy rates obtained after ET IVP bovine embryos of fresh, vitrified or frozen for direct transfer. Oocytes (n=3171) recovered by OPU Girolando females were selected and submitted to IVM for 24 hours at 38.5° C. with 5% $CO_2$ in air and saturated humidity. The IVF was done with sexed semen thawed, performed with 5 Holstein bulls. After IVF, the presumptive zygotes were denuded and cultured for seven days under the same conditions of temperature and humidity of IVM and IVF, but with 5% $CO_2$ and 5% $O_2$. Grade I embryos in stages of BL or BX were transferred in fresh, vitrified or frozen for direct transfer (DT). The embryos were transferred to previously synchronized recipients. The conception rates obtained were 51.35% (133/259) in fresh embryos, 34.62% (84/234) in vitrified ones and 42.11% (96/228) in the direct transfer embryos. The probability level of p<0.05 was considered significant. The rates obtained from the IVP embryos vitrified and direct transfer indicate that the cryopreservation of IVP embryos yields similar results to those obtained after transfer of fresh IVP embryos. The positive aspects of the possibility of cryopreservation of IVP embryos with the convenience of direct transfer are highlighted.

Example 1

Materials and Methods

Except where noted, all reagents were purchased from Sigma (St. Louis, MO, USA). The follicular aspiration procedures, in vitro maturation and in vitro fertilization described in Examples 1-3 were used for Examples 4 and 5.

Example 2

Collection of Oocytes and In Vitro Maturation

The work was carried out with the completion of 112 ovum pick up (OPU) guided by ultrasound in 36 female donors ½ blood from the cross Gir and Holstein. After aspiration session, oocytes (n=3171) were washed in TCM-199 medium (GIBCO BRL, Grand Island, NY) buffered with Hepes supplemented with 10% fetal bovine serum (FBS) (GIBCO BRL; Grand Island, NY), 0.20 mM sodium pyruvate and 83.4 mg/mL amikacin (BIOCHIMICO Institute, Rio de Janeiro, Brazil). The oocytes were pre-selected and classified into a mobile laboratory set up on the farm. After the selection of oocytes, they were transported to the laboratory on a BD Falcon tube 5 mL polystyrene containing 400 µL TCM-199 medium supplemented with 10% FBS, one mg/mL FSH (Folltropin™, Bioniche Animal Health, Belleville, Ont., Canada), 50 mg/mL hCG (Profasi™, Serono, Sao Paulo, Brazil) and estradiol (1 mg/mL), sodium pyruvate 0.20 mm and 83.4 mg/mL amikacin, covered by 350 µL of mineral oil. Recovered oocytes were transported to the laboratory located in Mogi Mirim/SP and kept in the same transport tube with maturation medium for 24 hours, counting from the moment the OPU.

Example 3

Preparation of Semen and In Vitro Fertilization (IVF)

The IVF was performed with semen of Holstein bulls (n=5) female sexed. Semen was thawed (35° C. for 30 sec) and washed twice by centrifugation (6000 rpm for 5 min) in 1 mL of TALP supplemented with 0.2 mM pyruvate and 83.4 g/mL amikacin, buffered with 10 mM Hepes. The concentration of semen was adjusted to $2 \times 10^6$ spermatozoa (sptz) mobile/mL. The insemination dosis was ten microliters ($10^5$ sptz) was added to each drop of 50 µL of TALP-FIV (TALP supplemented with 10 g/mL heparin, 18 M penicillamine, 10 M and 8 M hipotaurina epinephrine) under mineral oil. Later, were added 25-30 oocytes in every drop. The incubation was for 20-24 h at 38.5° C. incubator with 5% $CO_2$ and maximal humidity in air.

Example 4

Experiment I—Fresh IVP Embryos Transferred After Culture in the Presence or Absence of Fetal Bovine Serum (FBS)

In Vitro Culture (IVC) Embryos

Oocytes (n=665) were collected by follicular aspiration guided by ultrasound from Girolando donors (n=25). These were submitted to in vitro fertilization with sexed semen from the same Holstein bull, with aleatory distribution of oocytes between groups.

Group with FBS—presumptive zygotes (n=303) were cultured in 100 µL drops of SOF (synthetic oviductal fluid) (Wells et al., 1999) supplemented with 2.5% FBS+0.5% bovine serum albumin (BSA) under mineral oil. On the third (D3) and on day five (D5) of IVC, was performed substituting 50% of the volume of drops by a new medium ("feeding"). The culture medium of "feeding" the same medium was used in the early embryo development.

Group Without FBS—presumptive zygotes (n=362) were cultured in 100 µL drops of SOF modified without using FBS and supplemented only with 0.5% bovine serum albumin (BSA)+10 µM EDTA under oil mineral. On the third (D3) and on day five (D5) of IVC was performed substituting 50% of the volume of drops by a new medium ("feeding"). The culture medium of "feeding" the same medium was used in the early embryo development.

After 7 days of culture, the embryos of Groups with (n=82) or without FBS (n=88) were transferred in fresh to recipient cows previously synchronized. The females were used as recipients in the first third of lactation. For synchronization of the recipients, the following protocol was used:

Day zero (D0)—2 mg of estradiol benzoate (Sincrodiol®)+intravaginal implant placement (CIDR®)
Day seven (D7)—5 mL Prostaglandin F2á (Lutalyse®)
Day nine (D9)—Implant Removal and application of 1 mg of estradiol cypionate (ECP®)
Day eighteen (D18)—Embryo Transfer In Experiment 1, conception rates were compared in embryos cultured in two different medium, supplemented or not with FBS. As can be seen in Table 1, there was no difference between the two groups. This example demonstrates that fresh embryos grown in FBS supplemented media have similar viability and rates of conception as embryos not grown in FBS.

TABLE 1

Conception rate of fresh embryos transferred, grown with or without FBS.

| GROUP | OOCYTES | EMBRYOS TRANSFERRED | CONCEPTION 30 DAYS (%) | CONCEPTION 60 DAYS (%) |
|---|---|---|---|---|
| 2.5% FBS | 303 | 82 | 33 (37.5%)[a] | 31 (35.23%)[a] |
| No FBS | 362 | 88 | 38 (46.34%)[a] | 30 (36.59%)[a] |

[a]$p < 0.05$

Example 5

Comparison of Conception Rates of IVP Embryos Transferred in Fresh, Vitrified or Frozen for Direct Transfer In Vitro Culture (IVC) of Embryos Following the procedures described in Examples 2 and 3, presumptive zygotes were co-cultured (aleatory groups of 25 oocytes per drop) in the incubator (38.5° C. with 5% $CO_2$ and maximal humidity in air) with granulosa cells. The embryos for transfer in fresh or vitrification were cultured in 100 µL drops of SOF (Wells et al., 1999) supplemented with 2.5% FBS+0.5% bovine serum albumin (BSA) under mineral oil. On the third (D3) and on day five (D5) of IVC was performed substituting 50% of the volume of drops by a new medium ("feeding"). The culture medium of "feeding" was the same medium used in the early embryo development. Cleavage rate was evaluated on the third day of culture (D3).

Embryos for direct transfer freezing were cultured in 100 µL drops of SOF modified without FBS and supplemented only with 0.5% bovine serum albumin (BSA)+EDTA 10 µM under mineral oil. On the third (D3) and on day five (D5) of IVC was performed substituting 50% of the volume of droplets by a new medium ("feeding"). The culture medium of "feeding" was the same medium used in the early embryo development. Cleavage rate was evaluated on the third day of culture (D3).

At the end of the culture period (D7), the expanded blastocysts classified as grade 1, were loaded and transferred in fresh to previously synchronized recipients. In the absence of recipients available to all produced embryos, the surplus embryos were vitrified following the protocol described by SANCHES et al. (2013) or frozen for later direct transfer.

Embryo Vitrification

In this work, the embryos were cryopreserved for the vitrification method according to the protocol previously described by SANCHES et al., 2013.

Briefly, embryos (Bx, n=234) were exposed to 1 min in equilibration solution (SE=10% EG)+10% Dimethyl sulfoxide (DMSO) and then 20 seconds in the vitrification solution (VS=20% EG+20% DMSO). During the 20 seconds of exposure to vitrification solution, the embryos were housed in Cryotop® (Kitazato-Shizuoka-Japan), three to five embryos per Cryotop and immediately placed in liquid nitrogen. The embryo vitrification was based on the technique Cryotop, described by KUWAYAMA et al. (2005). This methodology uses the concept of minimum volume, where the embryos are placed in a very thin plastic film attached to a plastic rod used to facilitate handling. The vitrification solutions used were prepared in four-well plate (NUNC S/A, Roskilde, Denmark). The TCM-HEPES medium (TCM-199+25 mM Hepes+10% FBS) was the basis for the preparation of solutions containing EG and DMSO, and these have been added only at the time of use. In both groups, the equilibrium solution (ES) was supplemented with 20% FBS and vitrification solution (VS) was added 0.5 M sucrose. First, the embryos were placed on maintenance medium (TCM-HEPES), where they were removed (three to five each) and passed into the well 1, containing the ES. In this solution, embryos were remained for a minute and soon after were transferred to well 2, containing the VS, which were exposed for 20 seconds. Thus, the embryos were immediately pipetted and housed on the plastic film in Cryotop tip and the sample was immersed in liquid nitrogen.

Thawing of Vitrified Embryos

For thawing of vitrified embryos. Cryotops containing the embryos were exposed to air for four seconds and then dipped during the warming solution (TCM-Hepes+sucrose 0.3 Molar) with an approximate temperature of 35° C. Removal of the vitrification solution was made with two exposure times (5 minutes each) in gradients of 0.3 M sucrose and 0.15, respectively, before passing to the maintenance medium TCM-Hepes (Vieira et al. 2002; Mezzalira et al, 2004).

Slow Freezing of Embryos

In total, the embryos (n=228) were cryopreserved by slow freezing method previously described for embryos obtained in vivo (Voelkel and Hu, 1992). Blastocyst and expanded blastocyst were exposed to freezing solution (SC—solução de congelação), consisting of 1.5 M ethylene glycol for 10 minutes. The dish containing the SC and the embryos remained on the heated plate to 35° C. during this period. The embryos were loaded into 0.25 ml straws, and the embryo was placed on a central column, consisting of 1.5 M solution of Ethylene Glycol, surrounded by four columns thawing solution (SD—solução de congelação), interspersed with air columns from each other (FIG. 1). The thawing solution (SD) was composed of 0.75 M EG The EG 1.5 M was diluted in DPBS (Nutricell-Campinas-Brazil) in 1:1 ratio. After being loaded, the embryos were placed in freezing machine (TK 1000®-Uberaba-Brazil), previously stabilized at −6° C. Two minutes after being placed into the machine, was made the crystallization ("seeding") of the columns immediately above and below the embryo column. The embryos were maintained for 10 minutes at −6° C.

Figure 2:
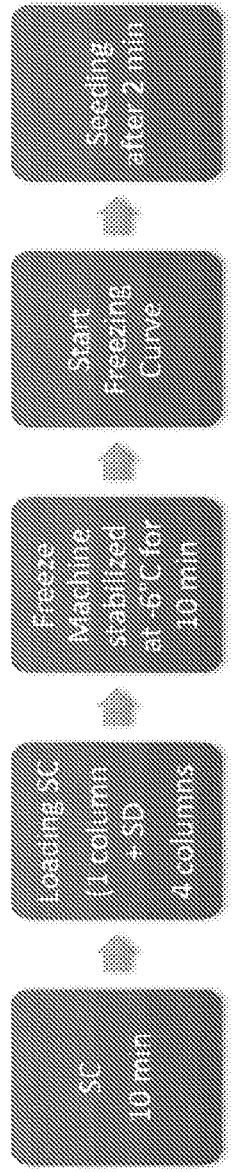
FIGS. 2A and B (together comprising FIG. 2) depict overviews of the Freezing (FIG. 2A) and Thawing (FIG. 2B) schemes as outlined in the Exemplification of the present disclosure.
Figure 2:
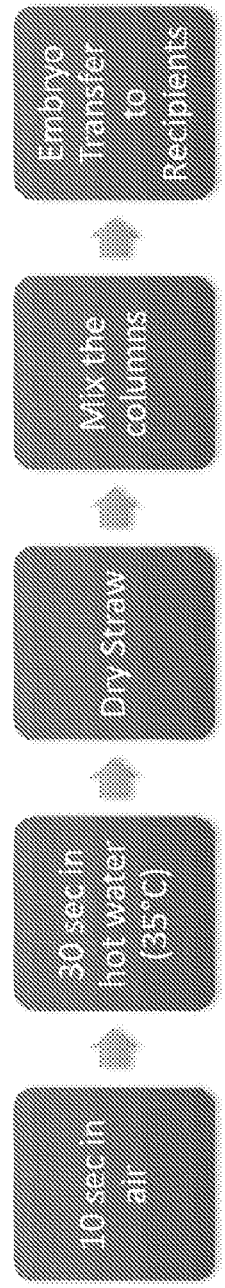

The freezing curve was started, lowering the temperature at 0.5° C./minute until reaching a level of −32° C. At the end of the freezing curve, the embryos were immersed directly in liquid nitrogen, where they were stored before being transferred to the recipient. See also FIG. 2A for an overview.

Thawing and Direct Transfer

At the time of transfer of cryopreserved embryos for direct transfer, embryos were removed from the liquid nitrogen container, exposed to air at room temperature for 10 seconds and then immersed in hot water at 35° C. for 30 seconds. The straw was dried with paper towels and gently agitated until the 5 columns inside were mixed. The goal was that the 4 thawing solution columns were mixed with the freezing solution column, to rehydration already initiated within the straw. After mixing the columns, the embryo was transferred to the uterine horn of the recipient. See also FIG. 2B for an overview.

Females used as recipients for fresh embryos, vitrified or direct transfer were in the first third of lactation. The synchronization protocol was the same used in Example 4.

Statistical Analysis

Conception rates at 30 and 60 days were analyzed by Binomial Logistic Regression of IBM SPSS Statistics version 22 (IBM Inc., Armonk, NY), considering the synchronization protocol variables, age of the recipient, animal category (lactating or dry) and bull used in IVF as fixed effects. The probability level p<0.05 was considered significant.

Results

In Example 5, conception rates were compared at 30 and 60 days of fresh embryos transferred, vitrified or frozen for direct transfer (Table 2). In this case, there was a difference between the conception rate of fresh embryos transferred 51.35% (133/259) compared to both groups with cryopreserved embryos. However, there was no difference (p<0.05) in conception rates for vitrified embryos 34.62% (84/234) compared to embryos of direct transfer 42.11% (96/228).

TABLE 2

Comparison between the conception rate at 30 and 60 days of IVP embryos transferred in fresh, vitrified or frozen for direct transfer and the percentage of fetal losses occurred in the 3 groups in the same period.

| EMBRYOS | EMBRYOS TRANS-FERRED | CONCEPTION 30 DAYS (%) | CONCEPTION 60 DAYS (%) | % LOSS (30-60 DAYS) |
|---|---|---|---|---|
| Fresh | 259 | 133 (51.4%)$^a$ | 112 (43.2%)$^a$ | 15.8% |
| Vitrified | 234 | 84 (34.6%)$^b$ | 73 (31.2%)$^b$ | 9.9% |
| Direct Transfer | 311 | 125 (40.19%)$^b$ | 108 (34.72%)$^b$ | 13.6% |

$^{a,b}$ p < 0.05

Discussion

Comparisons of conception rates of IVP embryos transferred in fresh, vitrified or frozen for direct transfer are detailed. This is the first study of its kind, particularly as to the consistent number of embryos transferred, in indicus-taurus cattle.

Data presented by Perry (2014) for the year 2013 showed that only 8.9% of IVP embryos transferred worldwide were cryopreserved. Without wishing to be bound by any particular theory, we propose that this low rate may be due to a higher sensitivity and/or lower viability (e.g., when exposed to embryo revitalization and/or transfer technologies) of these cryopreserved embryos as compared with fresh embryos; this low rate is a limiting aspect in using this technology for most commercial laboratories (George, 2008). However, given the growing number of IVP embryos produced, it has become crucial to find appropriate strategies for cryopreservation of embryos in vitro.

The world disposes of more than 90% of the embryos produced in vitro (Perry, 2014) which reflects a broader loss, when considering genetic material, supplies, materials and workmanship. Furthermore, the logistics of administering embryos to recipients becomes more critical when there is a requirement for working with only fresh embryos. For all these disadvantages, the disposal of surplus embryos increases the cost of the technique and makes it less profitable and competitive. According to PONTES, (2013), the In Vitro Brazil Company dismissed about 25,000 IVP embryos, between the years 2002 to 2008, because there was not a well-established cryopreservation protocol.

In addition to the challenges associated with cryopreservation and/or use of cryopreserved embryos, it appears there has been a considerable gap in the techniques adapted to different racial types of bovine animals. It is known there are various reproductive differences between animals taurus and indicus. For example, one difference is the characteristics of the organelles. Working with embryos in vivo, VISINTIN et al. (2002) demonstrated specific characteristics between Bos indicus and Bos taurus embryos, especially the amount of intracytoplasmic lipid. Considering the climatic and geographic conditions in Brazil, the aim of this work took place using embryos from a taurus-indicus-dairy herd, composed of donor Girolando. This crossbreed is responsible for 80% of milk production in Brazil, due to its good adaptability for milk production on pasture and at a lower cost (Girolando, 2015).

Interest in embryo production of Girolando females has provided several publications in recent years. PONTES et al. (2010) compared the production of embryos in follicular aspirations held in donor of Holstein, Gir and Gir. In this study, we observed a higher production of embryos aspiration in Gir cows in the Holstein (3.2 vs. 2.2, respectively). However, the production of embryos was greater on average twice as high (5.5 blastocysts) in Girolando when compared to the other two breeds. The present disclosure recognizes that such superior performance in IVP taurus indicus-embryos, permits development of improved embryonic cryopreservation technologies, for example in light of the abundance of samples in feasibility experiments and obtaining pregnancies.

IVP embryos are less cryo-tolerant when compared to in vivo embryos (Abe et al., 2002) and the causes of this increased sensitivity were attributed mainly to higher accumulation of intracellular lipids found in the cytoplasm of IVP embryos (Abe et al, 2002; Rizos et al, 2002; Sudano et al, 2011). In this context, fetal bovine serum (FBS) as a supplement to the medium used in culture was identified as responsible for the lower embryonic survival after freezing (Diez et al., 2001; Abe et al, 2002; Lonergan et al 2003). However, the highest concentration of intracytoplasmic lipid droplets cannot be considered the only detrimental factor to cryopreservation, one problem is multifactorial, involving the strict quality control at all stages of IVP, in obtaining an embryo quality with a view to be cryopreserved (Sudano et al., 2013).

In Example 4, follicular aspirations were performed in the same group of donors and embryos were cultured in the absence or presence of FBS. The objective was to compare pregnancy rates in both groups (with or without FBS) in fresh embryos transferred. There are some reports (George et al., 2008) of greater elongation of the fetus and embryonic disc more evident in those IVP embryos cultured with BSA, compared to embryos cultured with FCS (Fetal Calf Serum).

Direct comparisons between these works was valuable, for example because most other work only evaluates the re-expansion rates and hatching rates of the embryos, not reaching transfer the produced embryos. In addition, there are many differences between the composition of culture medium and culture conditions in each of these studies.

In the studies described in Example 4, no difference was observed in pregnancy (P<0.05) between groups, which allowed us to conclude dispensing FBS for in vitro culture resulted in a number of pregnancies consistent with not using FBS.

The present disclosure appreciates that, aside from considering FBS and the culture conditions, there is another important aspect to be considered: the cryoprotectant. Cryopreservation protocols should prevent the formation of intracellular ice crystals, and attempt to minimize the toxic and osmotic stress to the cells during freezing (Campos-Chillon et al., 2006). Thus, many of the cryoprotective agents such as glycerol and ethylene glycol (EG) are toxic to embryos (Dochi et al., 1988). Decreasing the time that the embryo is exposed to these cryoprotective agents before freezing and after thawing, can reduce the toxic effects, thus achieving higher post thaw embryo viability (Sommerfield and Niemann, 1999).

In the early 1990s, Voelkel and Hu (1992) demonstrated that the use of ethylene glycol as a cryoprotectant could be an alternative to the direct transfer of frozen-thawed embryos, with slightly lower conception rates than those achieved with fresh embryos (Voelkel Hu, 1992, Leibo and Mapleton, 1998). The direct transfer method enables the rehydration step in embryonic cells after thawing, can be simplified thereby making it more accessible and an easy technique to be performed in the field. Since then, the direct transfer has been widely accepted for the freezing of embryos produced in vivo, collected from superovulated donors.

However, for the IVP embryos, the most widely used method for IVP embryos freezing is vitrification (Morató and Mogas, 2014), mainly due to the speed of freezing and low cost. This made the embryo transfer a much more efficient technology, no longer depending on the availability of synchronized recipients. Whatever may be the freezing method, vitrification or direct transfer, conception rates are lower than those obtained with fresh embryos (Leibo and Mapletoft, 1998). The disadvantage of vitrification is the need for a qualified embryologist to perform reheating embryos, which is beyond the minimum structure required for a laboratory—further complicating its application in the field and on a large scale (Morató and Mogas, 2014).

In the present study, we used the protocol of slow freezing (direct transfer) of embryos with 1.5 M ethylene glycol as a cryoprotectant for embryos. However, in previous experiments carried out by our group, we found that when the embryos were frozen in the center column in 1.5 M ethylene glycol and the side columns were composed only of DPBS, the embryos had lower rates of hatching after thawing. Without wishing to be bound by any particular theory, we propose that one explanation for our observations was that the embryos were being rehydrated very quickly when in direct contact with the post thawing DPBS.

We chose to examine use of a thawing solution composed of 0.75 M ethylene glycol, arranged in four columns on both sides of the embryo. In this way, the inflow of water into embryonic cells could occur more slowly, maintaining its integrity. A similar strategy was presented to freezing embryos in vivo, using lateral columns to the embryo, consisting of a solution called the "holding medium," composed of 0.37 M ethylene glycol (Voekel and Hu, 1992). In that work, the pregnancy rate for the experimental group was the same as the control group (50%). Despite pregnancy rates being relatively low, around 40%, it is important to consider that in vivo embryos lower stress support for their development and provide higher pregnancy rates. The strategy of packaging of indicus-taurus embryos produced in vitro, can therefore be considered successful.

Another important point observed in such studies was the lowest rate of embryo survival after freezing when they were cryopreserved IVP embryos in compact morula stage, compared to embryos classified as blastocyst and expanded blastocyst. Similar results were found by authors who reviewed the morula and blastocyst of hatching rate, as an indicator of embryo survival after cryopreservation by slow method (Pollard and Leibo, 1993), but there is no consensus on what better stage for embryo cryopreservation (Saragusty and Arav, 2011).

The conception rate at 30 days of IVP fresh embryos transferred (51.4%) was higher (P>0.05) to those obtained with IVP embryos cryopreserved by vitrification (34.6%) and direct transfer (40.19%). These results were higher than those obtained by LIM et al. (2008), which transferred IVP embryos cultured in the absence of FBS and cryopreserved by slow freezing (22.9%) and also higher than the IVP embryos cryopreserved by vitrification with the Open Pulled Straw Technique (Vajta et al., 1998).

Without wishing to be bound by any particular theory, we propose that a combination of cultivation without FBS plus a loading strategy for positioning embryos within straw devices can be the reason our protocol was successful. The conception rate at 60 days of gestation was also evaluated, with higher (P>0.05) in the fresh embryos transferred (43.2%) when compared to results were similar to those published by Hasler et al. (1995), who obtained rate design 42% IVP taurus embryos transferred on day 7 post fertilization.

Findings herein demonstrate superiority of certain direct transfer (e.g., slow freezing) methodologies, as compared to vitrification as performed herein. In some embodiments of the present invention, it may be desirable to make a bank of embryos (e.g., using direct transfer/slow freezing technologies), for example that may be maintained at a first location (e.g., where produced). In some embodiments, transfer of such maintained embryos may prove more practical than use of vitrification technologies.

In some embodiments, technologies described herein utilize gender separated semen; IVP is generally considered to be the method that allows the highest efficiency use of gender separated semen, particularly valuable in dairy farming.

In some embodiments, one or more variations or improvements may be employed, for example, to reduce early embryonic loss rates observed in certain studies described herein (e.g., when comparing pregnancies at 30 and 60 days).

Among other things, the present disclosure provides achievements and advances in obtaining pregnancies through cryopreservation of IVP embryos. We conclude that in vitro produced embryos taurus-indicus can provide pregnancy rates around 40% after cryopreservation by vitrification methods or slow freezing/direct transfer. Those of ordinary skill in the art, reading the present disclosure, will appreciate that application of its teachings to different contexts (e.g., different breeds, different species, different subspecies, different crosses, and/or different hybrids, etc.) will reasonably be expected to achieve pregnancy rates of at least about 10%, about 11%, about 12%, about 15%, about 20%, about 25%, about 30%, about 35%, about 40%, about 45%, or about 50%, in each case materially higher than those typically observed (e.g., about 9%) with current technologies.

It is particularly worth noting that technologies described herein, by particularly improving and/or enabling (e.g., by permitting achievement of pregnancy rates of at least 30%) effective slow freezing/direct transfer strategies, represent an important step for the in vitro production of embryos become a biotech wider use in livestock.

EQUIVALENTS

Those skilled in the art will recognize, or be able to ascertain using no more than routine experimentation, many equivalents to the specific embodiments of the invention described herein. The scope of the present invention is not intended to be limited to the above Description, but rather is as set forth in the following claims:

I claim:

1. A method of freezing an in vitro produced ungulate embryo comprising the steps of:
   (1) incubating the in vitro produced ungulate embryo in a freezing solution comprising 1.0 to 4 molar (M) ethylene glycol for 5 to 30 minutes at a first temperature between 10° C. and 38° C.;
   (2) loading the in vitro produced ungulate embryo in a receptacle comprising the steps of adding:
      i) a first thawing solution to said receptacle;
      ii) a first air bubble and a second thawing solution, wherein said first air bubble separates said first and second thawing solutions;
      iii) a second air bubble and said in vitro produced ungulate embryo in a freezing solution, wherein said second air bubble separates said second thawing solution and said in vitro produced ungulate embryo in a freezing solution;
      iv) a third air bubble;
      v) a third thawing solution, wherein said third air bubble separates said in vitro produced ungulate embryo in a freezing solution and said third thawing solution;
      vi) a fourth air bubble; and
      vii) a fourth thawing solution, wherein said fourth air bubble separates said third and fourth thawing solutions and said first, second, third, and fourth thawing solutions comprise ethylene glycol in an isotonic diluent medium;
   (3) exposing the receptacle comprising the in vitro produced ungulate embryo to a temperature of −2° C. to −10° C. for a time period of 1 min to 60 minutes;
   (4) lowering said temperature at a rate of −0.2° C. to −0.8° C. per minute until reaching a second temperature of about −30° C. to about −36° C.; and
   (5) immersing said in vitro produced ungulate embryo in liquid nitrogen for storage, thereby producing a frozen in vitro produced ungulate embryo.

2. The method of claim 1, wherein the in vitro produced ungulate embryo is incubated in the freezing solution for 10 minutes at 35° C.

3. The method of claim 1, wherein the in vitro produced ungulate embryo in the freezing solution is surrounded by four columns of thawing solution, interleaved by columns of air between them.

4. The method of claim 1, wherein the thawing solution comprises about 0.75 M of ethylene glycol.

5. The method of claim 1, wherein the freezing solution comprises about 1.5 M ethylene glycol.

6. The method of claim 1, wherein the thawing solution is a 1:1 dilution of the freezing solution in isotonic diluent medium.

7. The method of claim 1, wherein the thawing solution is a 1:1 dilution of the freezing solution in isotonic diluent medium comprising DPBS.

8. The method of claim 1, wherein the ethylene glycol is present at a final concentration of about 0.2 to about 1.3 Molar.

9. The method of claim 3, wherein the receptacle comprising the in vitro produced ungulate embryo is exposed to a temperature of −6° C. for 10 minutes.

10. The method of claim 1, wherein the temperature is lowered at a rate of −0.5° C. per minute until the second temperature of about −32° C. is reached.

11. The method of claim 1, further comprising thawing said frozen in vitro produced ungulate embryo, wherein the thawing comprises:
   (1) exposing the receptacle that contains said frozen in vitro produced ungulate embryo to a first thawing environment for a first period of time sufficient to thaw said thawing solutions;
   (2) exposing said receptacle to a second thawing environment at a thawing temperature between 10° C. to 38° C. for a second period of time, sufficient to thaw the freezing solution; and
   (3) mixing the thawing solutions, freezing solutions and said frozen in vitro produced ungulate embryo within the receptacle, thereby generating a thawed in vitro produced ungulate embryo.

12. The method of claim 11, wherein:
   (1) the first thawing temperature is from 10° C. to 38° C.;
   (2) the second thawing temperature is from 20° C. to 38° C.;
   (3) the thawing environment is or comprises a liquid bath; or
   (4) the step of mixing is achieved through gentle agitation of the receptacle.

13. The method of claim 11, further comprising transferring said thawed in vitro produced ungulate embryo to a recipient ungulate.

14. The method of claim 11, wherein said in vitro produced ungulate embryo is in a developmental stage selected from the group consisting of morula, early blastocyst, blastocyst, and expanded blastocyst.

15. The method of claim 11, wherein said in vitro produced ungulate embryo is an in vitro produced ungulate embryo selected from the group consisting of *Bos taurus*, *Bos indicus*, and crossed breed *Bos indicus-taurus*.

16. A method of freezing an ungulate embryo comprising:
   (1) exposing the ungulate embryo to a freezing solution consisting of 1.0-4M of ethylene glycol for 10 minutes at 35° C.;
   (2) positioning the ungulate embryo in the freezing solution within a receptacle dimensioned as a straw, wherein the ungulate embryo in the freezing solution is surrounded by four columns of thawing solution, interleaved by columns of air between them, and wherein the thawing solution comprises 0.75 M of ethylene glycol;
   (3) exposing the receptacle to temperature conditions stabilized at a temperature of about 0° C. to about −10° C.;

(4) crystallizing the columns of thawing solution for two minutes after being placed in a freezing machine;
(5) maintaining the ungulate embryo for 1 to 60 minutes at a temperature of about 0° C. to about −10° C.;
(6) lowering the temperature at a rate of about −0.2 to about −0.8° C. per minute until reaching a second temperature of about −30 to about −36° C.; and
(7) immersing the frozen ungulate embryo in liquid nitrogen, thereby producing a frozen ungulate embryo.

17. The method of claim 16, further comprising thawing said frozen ungulate embryo, wherein the thawing comprises:
(1) exposing the receptacle that contains said frozen ungulate embryo to a first thawing environment for a first period of time sufficient to thaw said thawing solutions;
(2) exposing said receptacle to a second thawing environment at a thawing temperature between 10° C. to 38° C. for a second period of time, sufficient to thaw the freezing solution; and
(3) mixing the thawing solutions, freezing solutions, and said frozen ungulate embryo within the receptacle, thereby generating a thawed ungulate embryo.

18. The method of claim 17, wherein:
(1) the first thawing temperature is from 10° C. to 38° C.;
(2) the second thawing temperature is from 20° C. to 38° C.;
(3) the thawing environment is or comprises a liquid bath; or
(4) the step of mixing is achieved through gentle agitation of the receptacle.

19. The method of claim 17, further comprising transferring said thawed ungulate embryo to a recipient ungulate.

20. The method of claim 17, wherein said ungulate embryo is in a developmental stage selected from the group consisting of morula, early blastocyst, blastocyst, and expanded blastocyst.

21. The method of claim 17, wherein said ungulate embryo is an ungulate embryo selected from the group consisting of *Bos taurus, Bos indicus*, and crossed breed *Bos indicus-taurus*.

22. The method of claim 16, wherein the ungulate embryo is an in vitro produced ungulate embryo.

* * * * *